United States Patent [19]

Ideta et al.

[11] Patent Number: 4,541,791

[45] Date of Patent: Sep. 17, 1985

[54] VANED HYDRAULIC SYSTEM

[75] Inventors: Yasufumi Ideta; Tadashi Fujikawa, both of Sagamihara, Japan

[73] Assignee: Nissan Motor Co., Ltd., Yokohama, Japan

[21] Appl. No.: 561,669

[22] Filed: Dec. 15, 1983

[30] Foreign Application Priority Data

Mar. 9, 1983 [JP] Japan .................................. 57-36742

[51] Int. Cl.[4] .............................................. F01C 17/00
[52] U.S. Cl. .................................... 418/182; 418/257
[58] Field of Search ................ 418/257, 258, 270, 182

[56] References Cited

U.S. PATENT DOCUMENTS 1,654,865  1/1928  Cozette ................................ 418/182

FOREIGN PATENT DOCUMENTS 5711233  6/1955  Japan .

Primary Examiner—Leonard E. Smith
Assistant Examiner—Jane E. Obee
Attorney, Agent, or Firm—Schwartz, Jeffery, Schwaab, Mack, Blumenthal & Evans

[57] ABSTRACT

A vane pump has a housing comprising a pump cover and a pump housing. The pump cover is integrally formed with a hollow fixed shaft projecting therefrom and inserted loosely into a longitudinal hole of the pump housing. Received in the housing are a cam ring, a rotor eccentrically disposed for rotation within the cam ring, a plurality of vanes radially slidably provided through the rotor, a pair of annular vane rings disposed coaxially with the cam ring and an annular centering member mounted to the base portion of the fixed shaft adjacent the pump cover such that the centering member is arranged in a radially shifted position from the annular vane rings.

6 Claims, 5 Drawing Figures

VANED HYDRAULIC SYSTEM

BACKGROUND OF THE INVENTION

The present invention relates to a vaned hydraulic system such as a vane pump or a vane motor, more specifically a vaned hydraulic system the longitudinal length of which can be reduced.

The vaned hydraulic system such as a vane pump can be used as a hydraulic pump for an automatic transmission of a vehicle.

One example of such conventional vane pumps is shown in FIGS. 1 and 2, wherein a hydraulic vane pump for a automatic transmission is generally indicated by reference numeral 1. The vane second pump 1 has a housing 4 comprising a first pump cover 2 and a pump cover 3. The pump cover 2 is integrally formed with a hollow fixed shaft 5 which is loosely inserted into a longitudinal hole 6 in the pump cover such that the fixed shaft 5 is coaxial with the longitudinal hole 6. Located within the housing 4 are a stationary cam ring 7 of a substantially cylindrical configuration, a substantially cylindrical rotor 8 rotatably disposed within the cam ring 7 in a coaxial relationship with the fixed shaft 5 and in an eccentric relationship with the cam ring 7, a plurality of vanes each slidably disposed in a radial groove within the rotor 8 and adapted to project radially outwardly from the outer circumferential surface of the rotor to abut slidably at its tip against the inner circumferential surface of the cam ring 7, and a pair of vane rings 10 and 11 disposed at the opposite sides of the rotor 8 concentrically with respect to the cam ring 7 within the rotor 8 to guide the vanes 9 to abut slidably at the tips thereof against the inner surface of the cam ring 7. The vane rings 10 and 11 are disposed rotatably with respect to the rotor 8 within circular recesses 12 and 13 respectively. The circular recesses 12 and 13 are defined by portions depressed or less in thickness (longitudinal length) at the opposite sides (the right and left sides as viewed in FIG. 1) of the rotor 8. A hollow pump driving shaft 14 as a power transmission shaft is inserted at one end thereof into the housing 4 from the outside of the housing 4 through the longitudinal hole 6 provided within the pump cover 3. The pump driving shaft 14 is also inserted coaxially into the central hole 15 at the center of the rotor 8 and connected with the rotor 8 so as to rotate integrally therewith. The other end (not shown) of the pump driving shaft is connected with a crank shaft of an engine (not shown) through a pump impeller of a torque converter (not shown). A centering member 16 is disposed within the rotor 8 and adapted to be positioned between the rotor 8 and the housing 4 so as to position the rotor 8 before inserting the driving shaft 14 into the housing 4 such that the central hole 15 of the rotor 8 is arranged coaxially with the hole 6 of the housing 4 thereby smoothing insertion of the driving shaft 14 into the central hole 15. The centering member 16 has a cylindrical portion 16a and a flange portion 16b extending radially outwardly from the cylindrical portion 16a. The cylindrical portion 16a is adapted to be inserted into the hole 6 of the housing 4 whereas the flange portion 16b abuts on the circumferential wall 13a of the recess 12 of the rotor 8, whereby the rotor 8 is positioned.

As will be understood from the foregoing description, the vane rings 10 and 11 and the flange portion 16b of the centering member 16 are placed in series in the axial direction of the rotor 8 within the recesses 12 and 13 of the rotor 8. Accordingly, the thickness (axial length) t of the radially inward portion between the recesses 12 and 13 of the rotor 8 must be thinner than that T of the radially outward portion by the amount equivalent to the substantially total thickness of the two vane rings 10 and 11 and the flange portion 16b of the centering member 16.

The vane pump is constructed such that when the driving shaft 14 is rotatingly driven by the engine (not shown), the rotor 8 is rotated together with the driving shaft thereby causing the vanes to draw hydraulic fluid from a suction conduit or passage (not shown) and discharge the same to a discharge conduit or passage (not shown).

In such a prior art vane pump 1, however, the two vane rings 10 and 11 and the centering member 16 are positioned in series in the axial direction of the rotor as previously set forth, so that the thickness (axial length) t of the radially inward portion of the rotor 8 is less than the thickness T of the radially outward portion, which would reduce the mechanical strength at the radially inward portion of the rotor 8 where forces from the driving shaft 14 are directly imposed. Consequently, in the prior art vane pump 1, the thickness t of the rotor 8 at the radially inward portion thereof must be large enough to provide for reliable strength, whereas the thickness T of the rotor 8 at the radially outward portion thereof is correspondingly thicker than the thickness t by the amount equivalent to the total thickness of the vane rings 10 and 11 and the flange portion 16b of the centering member 16. This would enlarge the axial length of the rotor and therefore the whole axial length of the vane pump 1, which would in turn make the vane pump 1 heavy in weight.

Accordingly, the primary object of the present invention is to reduce the whole axial length of a rotor without decreasing the mechanical strength of the same.

Another object of the present invention is to avoid the reduction in thickness at the radially inward portion of the rotor as much as possible.

Another object of the present invention is to provide a compact and light-weighted vaned hydraulic system, thereby overcoming the problems in the prior art hydraulic system as mentioned above.

SUMMARY OF THE INVENTION

The present invention, in accordance with one embodiment thereof, relates to a vaned hydraulic system, wherein a centering member is entirely disposed at a radially shifted position from vane rings within the rotor, thereby preventing the reduction of the thickness at the radially inward portion of the rotor as much as possible.

BRIEF DESCRIPTION OF THE DRAWING

This invention will be better understood from the following description taken in conjuction with the accompanying drawings, wherein.

DESCRIPTION OF THE PREFERRED EMBODIMENT

Figure 1:
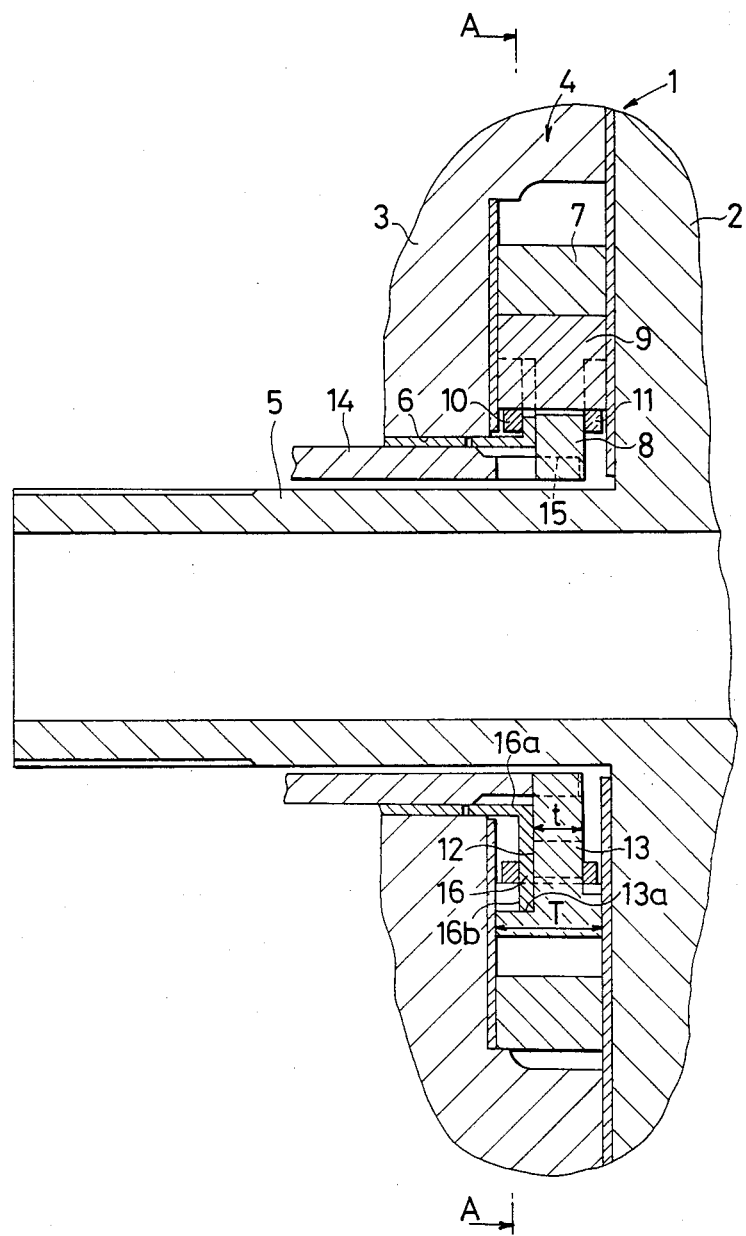
FIG. 1 is a partial longitudinal cross sectional view of a conventional vane pump.
Figure 2:
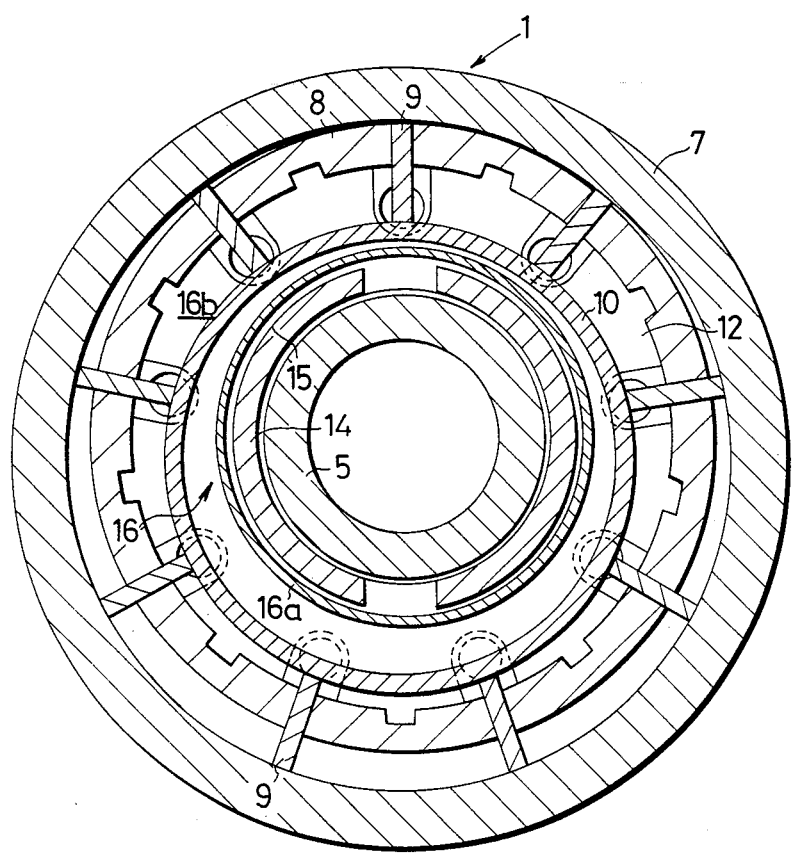
FIG. 2 is a cross sectional view taken along the line A—A of FIG. 1.
Figure 3:
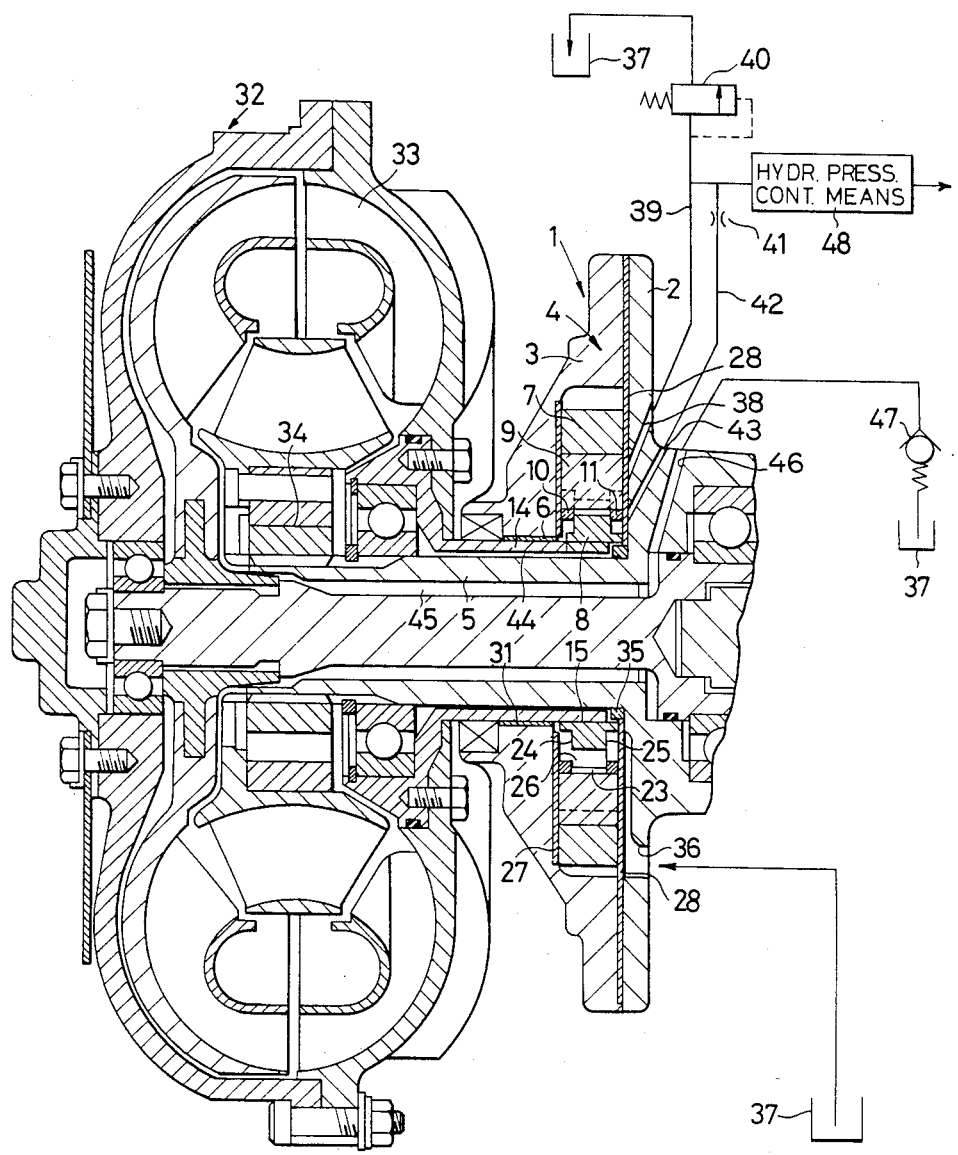
FIG. 3 is a longitudinal cross sectional view of a vane pump according to one embodiment of the present invention wherein part of an automatic transmission is also illustrated.
Figure 4:
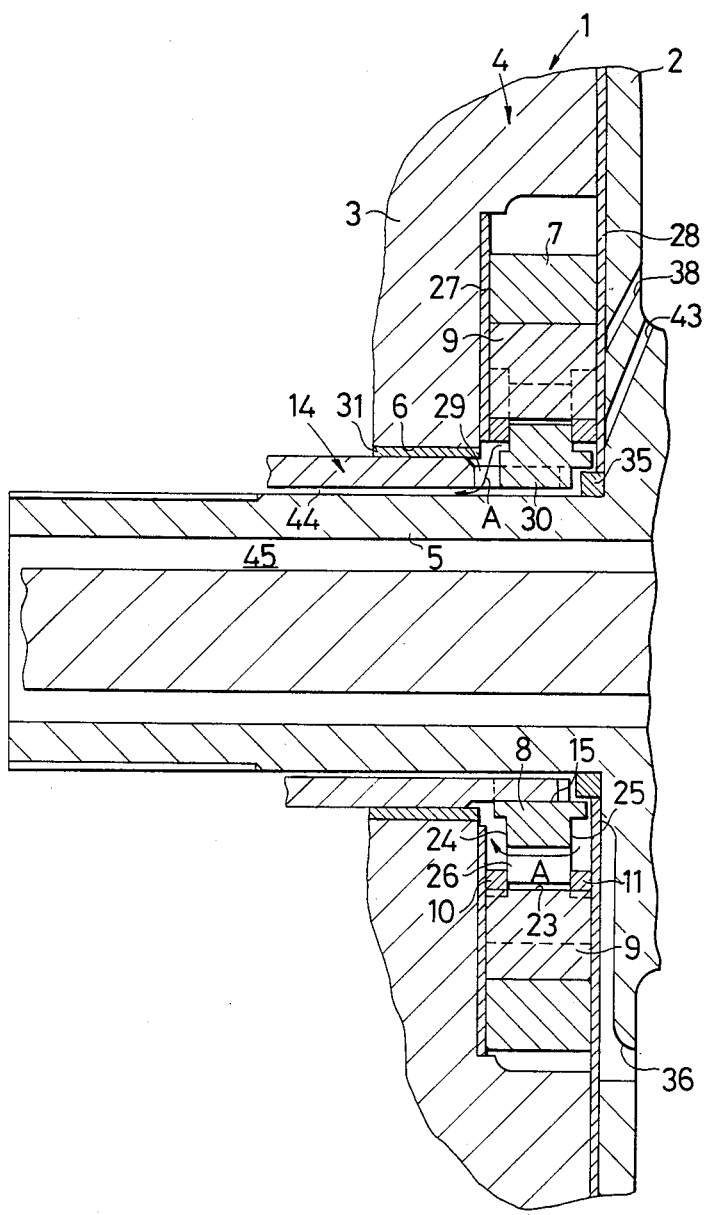
FIG. 4 is an enlarged partial longitudinal cross sectional view of the vane pump of FIG. 3.
Figure 5:
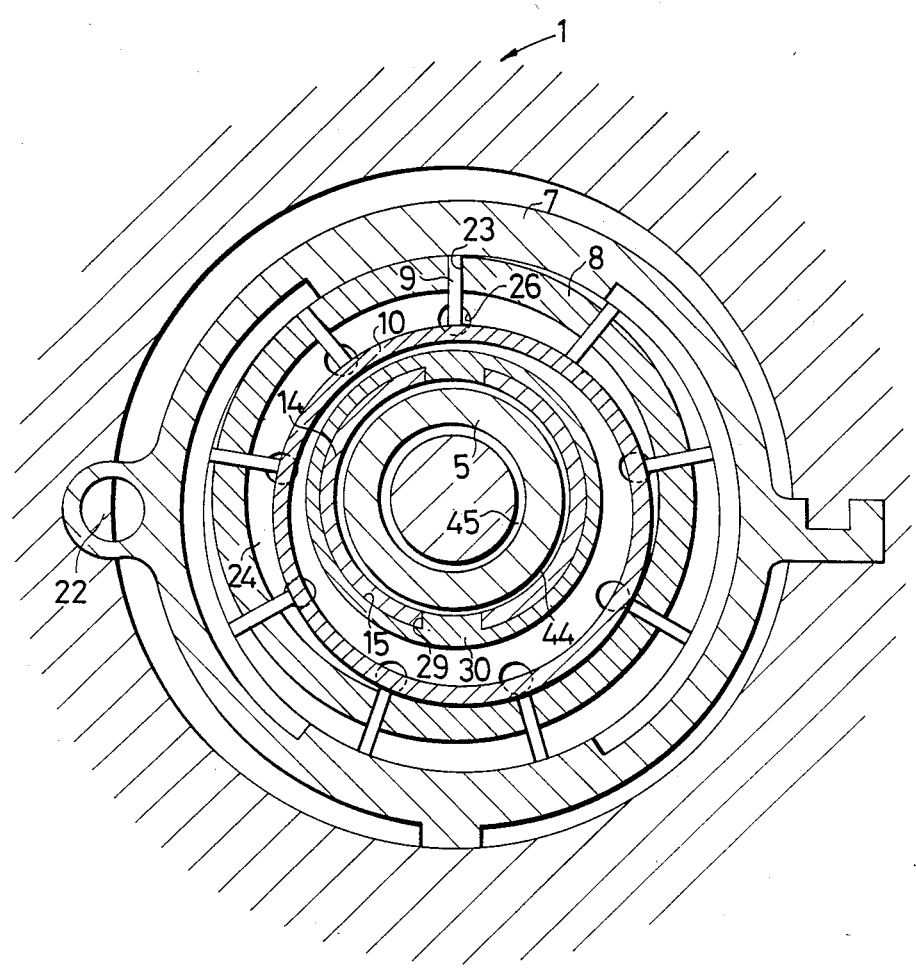
FIG. 5 is an enlarged lateral cross sectional view of the vane pump of FIG. 3.

Turning now to FIGS. 3 to 5 illustrating one embodiment of the present invention, wherein like numerals designate previously described elements, a vane pump 1 for an automatic transmission has a housing 4 comprising first a pump cover 2 and a second pump cover 3.

The pump cover 2 is integrally formed with a hollow fixed shaft 5 projecting therefrom and inserted loosely into a longitudinal hole 6 of the pump cover 3 in a coaxial relationship therewith. Received within the housing 4 are a substantially cylindrical cam ring 7 pivotally supported by the housing 4 at a point 22 (FIG. 5), a substantially cylindrical rotor 8 disposed for rotation within the cam ring 7 and arranged eccentrically with respect to the cam ring 7 and coaxially with respect to the fixed shaft 5, a plurality of vanes 9 disposed slidably within grooves 23 radially provided in the outer peripheral portion of the rotor 8, each of the vanes being adapted to project radially outwardly from the outer circumferential surface of the rotor 8 with the tip thereof slidably abutting against the inner circumferential surface of the cam ring 7, and a pair of annular vane rings 10 and 11 disposed coaxially with the cam ring 7 and in abutting engagement against the vanes at the inner end thereof within the rotor 8. The vane rings 10 and 11 are arranged rotatably relative to the rotor 8 and at the opposite sides of the rotor 8 (the right and left sides of the rotor as viewed in FIGS. 3 and 4) in annular recesses 24 and 25. The annular recesses 24 and 25 are depressed from the opposite surfaces of the radially outward portion of the rotor 8, or in other words, the thickness (the axial length) of the depressed portion of the rotor 8 is thinner than the radially outward portion of the rotor 8. The annular recesses 24 and 25 are communicated with each other through a plurality of ports 26 provided radially inward of the grooves 23. A first side plate 27 is sandwiched between the pump cover 3 and the cam ring 7 associated with the vanes 9 whereas a second side plate 28 is sandwiched between the pump cover 2 and the cam ring 7 associated with the vanes 9. The fixed shaft 5 extends through a hollow pump driving shaft 14 as a power transmission shaft in a manner that the fixed shaft 5 is inserted at one end thereof into the housing 4 from the outside thereof through the longitudinal hole 6 provided within the pump cover 3 and positioned coaxially within the central hole 15 provided at the center of the rotor 8. The rotor 8 has projections 30 formed within the central hole 15 thereof, whereas the driving shaft 14 has grooves 29 formed at the tip portion thereof into which the projections 30 are inserted respectively. Accordingly, the driving shaft 14 rotates together with the rotor 8. The driving shaft 14 is rotatably supported by a bush 31 and connected at the other end thereof to a pump impeller 33 of a torque converter 32 as shown in FIG. 3. The pump impeller is in turn connected to a crank shaft of an engine (not shown). Mounted to the tip portion of the fixed shaft 5 projecting toward the torque converter is a one-way clutch 34 of the torque converter 32. As illustrated in detail in FIG. 4, an annular centering member 35 is mounted to the base portion of the fixed shaft 5 adjacent the pump cover 2 by means of press fitting etc. It will be noted that the centering member is disposed at a radially shifted position from the vane rings 10 and 11, in other words, arranged parallel to the vane rings 10 and 11 in the axial direction of the rotor, which is a difference from the prior art vane pump previously mentioned. The centering member 35 is provided in a fitting relationship with the rotor 8 with a slight clearance therebetween, so that when mounting the rotor 8 in the housing 4, the centering member 35 is adapted to be abutted along the outer periphery thereof against the inner periphery of the central hole 15 of the rotor 8 so as to position the rotor 8 in place (in the vertical direction as viewed in FIG. 4). Consequently, the central hole 15 of the rotor 8 and the hole 6 of the pump cover 3 are to be disposed coaxially with each other before the driving shaft 14 is fitted into the central hole 15 of the rotor 8, thereby smoothing insertion of the driving shaft 14 into the central hole 15. The pump cover 2 is formed with a suction port 36 communicated with a reservoir 37 and also with a discharge port 38 communicated with a regulator valve 40 through a hydraulic conduit 39. The hydraulic conduit 39 is communicated with a hydraulic conduit 42 through an orifice 41 which is in turn communicated with the interior of the rotor 8 adjacent the pump cover 2 through a hydraulic conduit 43 within the pump cover 2. The interior of the rotor 8 adjacent the pump cover is communicated with a hydraulic passage 44 formed between the outer periphery of the fixed shaft 5 and the inner periphery of the driving shaft 14 through the annular recess 25, the ports 26, the annular recess 24 and the grooves 29 of the driving shaft 14 as shown by the arrow A in FIG. 4. The hydraulic passage 44 is communicated with the interior of the torque converter 32 as shown in FIG. 3. The interior of the torque converter 32 is communicated with a pressure maintaining valve 47 through a hydraulic passage 45 provided within the fixed shaft 5 and a hydraulic passage 46 provided within the pump cover 2. The hydraulic fluid is drained from the pressure maintaining valve 47 to the reservoir 37. The hydraulic conduit 39 communicated with the discharge port 38 is also communicated with a hydraulic pressure control means 48 which is associated with a clutch mechanism etc. of an automatic transmission (not shown). The regulator valve 40 serves to drain excessive hydraulic fluid to the reservoir 37.

In operation, the torque converter 32 is driven by the engine (not shown), which causes the driving shaft 14 to rotate the rotor 8, whereby hydraulic fluid in the reservoir 37 is drawn through the suction port 36 and discharged through the discharge port 38. The pressured fluid discharged from the discharge port 38 into the hydraulic conduit 39 is controlled by the regulator valve 40 to a predetermined pressure. Part of the hydraulic fluid is then transferred to the hydraulic pressure control means 48 whereas the other is transferred into the torque converter 32 through the orifice 41, the hydraulic conduit 42, the hydraulic passage 43, the interior of the rotor 8 and the hydraulic passage 44. The hydraulic fluid in the torque converter 32 is drained through the hydraulic passages 45 and 46 and the pressure maintaining valve 47. The discharge rate of the vane pump 21 can be varied by pivoting the cam ring 7 around the point 22 (shown in FIG. 5) thereby varying the eccentricity of the rotor 8 and the cam ring 7.

The centering member 35 is provided to form a suitable clearance between the rotor 8 and the fixed shaft 5 before inserting the driving shaft 14 along the clearance into the central hole 15 of the rotor 8 for connection, thereby smoothing insertion of the driving shaft 14 into the central hole 15, which has been set forth previously. After the insertion of the driving shaft 14, a slight clearance is formed between the rotor 8 and the centering member 35 as shown in FIG. 4, so that the rotor 8 does not abut against the centering member 35.

As described previously, the centering member 35 is entirely disposed at a radially shifted position from the vane rings 10 and 11 within the rotor 8 of the vane pump 21, so that the decrease of the thickness (axial length) of the radially inward portion of the rotor 8 would not be beyond the amount equivalent to the total thickness of the vane rings 10 and 11. In other words, the thickness of the centering member 35 does not affect the radially inward portion of the rotor 8. Consequently, the reduction in strength at the relatively weak, radially inward portion of the rotor 8 can be avoided as much as possible, so that the whole axial length of the rotor 8 can be shortened. In other words, the whole axial length of the rotor 8 is equal to the sum of the length of the radially inward portion of the rotor 8 with necessary strength plus the thickness of the vane rings 10 and 11, and therefore thinner than that of the prior art rotor by the amount of the thickness of the centering member. Otherwise, if the whole axial length of the rotor is kept the same as the prior art rotor, the radially inward portion of the rotor would become thicker and therefore stronger than the prior art rotor.

It will be understood that the vaned hydraulic system according to the present invention can be compact and light-weighted by decreasing the axial length thereof.

After reference to the foregoing description about one embodiment of the present invention, modifications of the present invention may occur to those skilled in the art. For instance, the present invention can be applied to the other vaned hydraulic systems such as a vane motor. It is to be noted that this invention is intended to cover all modifications coming within the spirit and scope of the invention as claimed.

What is claimed is:

1. A vaned hydraulic system comprising:

a housing comprising a first pump cover integrally formed with a fixed shaft projecting therefrom and a second pump cover having a longitudinal hole for receiving said fixed shaft to be inserted therein, a cam ring pivotally received within said housing, a rotor disposed for rotation radially inward of said cam ring and radially outward of said fixed shaft and arranged eccentrically with respect to said cam ring, a plurality of vanes disposed radially slidably through said rotor, a pair of vane rings disposed at the opposite sides of said rotor and radially inward of said vanes in abutting engagement against said vanes, a driving shaft adapted to be inserted into said hole of said second pump cover for connection to said rotor, and a centering member entirely disposed at a radially shifted position from said pair of vane rings so as to position the rotor in place before said driving shaft is inserted into said hole of said second pump cover.

2. The vaned hydraulic system of claim 1, wherein said centering member is disposed between said rotor and said first pump cover in a fitting relationship with the inner periphery of said rotor with a slight clearance therebetween.

3. The vaned hydraulic system of claim 1, wherein a central hole defined by said inner periphery of said rotor is disposed coaxially with said longitudinal hole of said second pump cover by means of said centering member, thereby smoothing insertion of said driving shaft into said central hole.

4. The vaned hydraulic system of claim 1, wherein said entirely radially shifted arrangement of said centering member from said pair of annular vane rings provides a means for increasing the thickness of said rotor.

5. The vaned hydraulic system of claim 1, wherein said centering member is mounted entirely radially inward of said pair of vane rings to the base portion of the fixed shaft adjacent the pump cover 2.

6. The vaned hydraulic system of claim 5, wherein said centering member provides a clearance in place between said rotor and said fixed shaft to receive said driving shaft smoothly.

* * * * *